B. R. TILLSON.
DEMOUNTABLE RIM.
APPLICATION FILED SEPT. 14, 1908.
925,532.
Patented June 22, 1909.
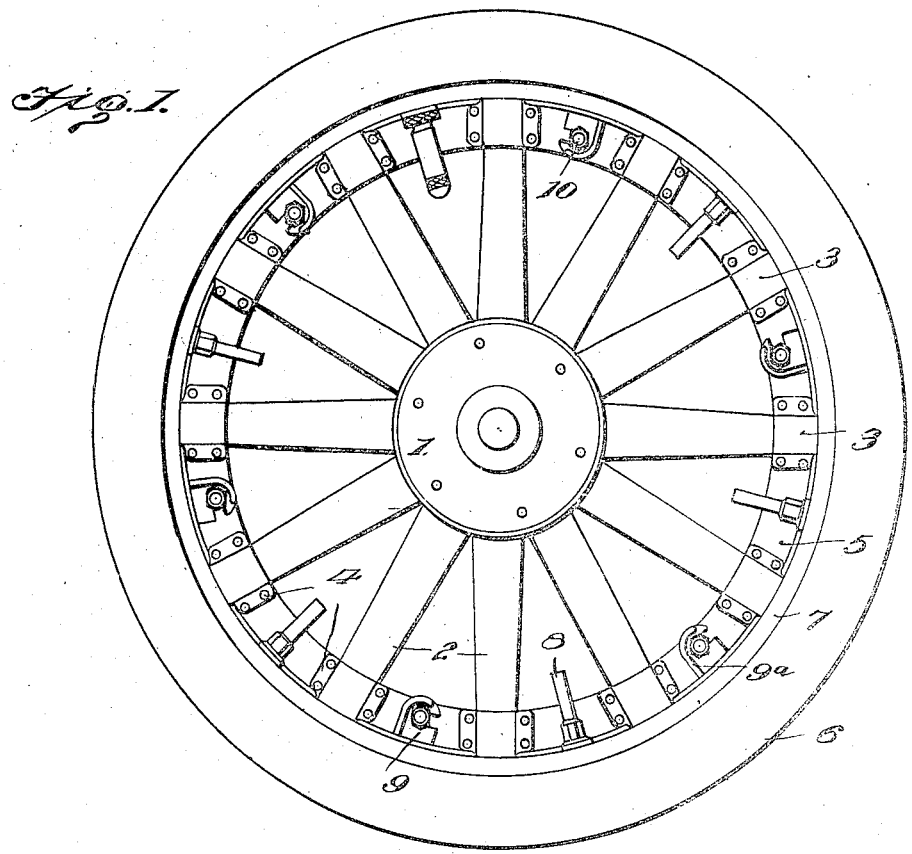
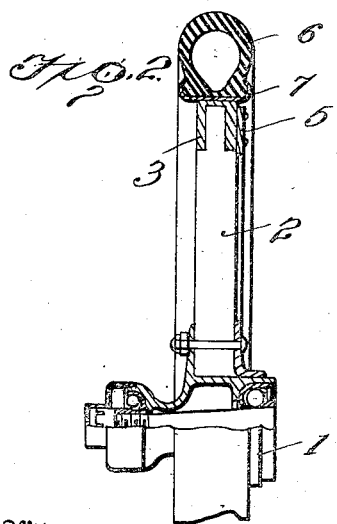
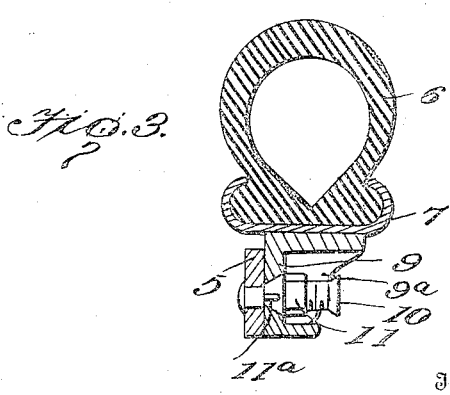
Witnesses
Inventor
B. R. Tillson.
By ......., Attorneys

UNITED STATES PATENT OFFICE.

BENJAMIN R. TILLSON, OF PORTLAND, MAINE.

DEMOUNTABLE RIM.

No. 925,532.　　　Specification of Letters Patent.　　　Patented June 22, 1909.

Application filed September 14, 1908. Serial No. 452,869.

*To all whom it may concern:*

Be it known that I, BENJAMIN R. TILLSON, citizen of the United States, residing at Portland, in the county of Cumberland and State of Maine, have invented certain new and useful Improvements in Demountable Rims, of which the following is a specification.

The present invention relates to improvements in wheels of that type which are commonly employed upon automobiles, and the object of the invention is the provision of a wheel in which the rim is peculiarly connected to the spokes in such a manner as to be readily detached therefrom. The tire is ordinarily carried by this rim, and should the tire be punctured or for any reason become deflated, the rim can be quickly removed and replaced by another rim without the necessity of detaching the tire therefrom.

The invention contemplates a wheel of this character which is simple and inexpensive in its construction and in which the rim is held rigidly in position when the wheel is in use, and can be quickly removed should the tire be punctured or otherwise injured.

With this and other objects in view that will more fully appear as the description proceeds, the invention consists in certain constructions and arrangements of the parts that I shall hereinafter fully describe and claim.

For a full understanding of the invention and the merits thereof, and to acquire a knowledge of the details of construction, reference is to be had to the following description and accompanying drawing, in which:

Figure 1 is a side elevation of a wheel provided with a demountable rim constructed in accordance with the invention; Fig. 2 is an edge view of the wheel, portions being broken away; and, Fig. 3 is an enlarged sectional view through the rim.

Corresponding and like parts are referred to in the following description and indicated in all the views of the drawing by the same reference characters.

Specifically describing the present embodiment of the invention, the numeral 1 designates the hub of a wheel, and 2 the spokes radiating therefrom. Applied to the extremities of the spokes are the caps 3 which are formed with the laterally projecting flanges 4. A flat ring 5 is riveted or otherwise rigidly secured to these flanges 4 and fits against one side of the spokes so as to be off-set from the central plane through the same. The tire 6 which may be of any approved construction, is secured to a rim 7 which fits around the spokes 2 and bears against the ends thereof.

The numerals 8 designate the tire bolts which project inwardly from the rim and are arranged between the spokes 2. Secured to the inner face of the rim 7 are the hooked members 9 which are designed to engage threaded studs 10 upon the ring 5. In the present instance, the hooked members 9 are shown as reinforced by a flange $9^a$ extending around the outer edge of the same, the said flange also serving to protect the nut 11 upon the threaded stud 10 and prevent the same from being turned by contact with an exterior object. After the rim has been applied to the spokes with the openings of the hooked members 9 opposite the studs 10, the rim is rotated until the studs enter the said hooked members, and the nuts 11 then applied. It will be observed that the inner ends of the nuts are tapered and split at $11^a$, the split portions being forced together when the nut is tightened, and caused to firmly grip the stud so as to prevent the nut from working loose. In the construction shown on the drawing, the extremities of the studs 10 are enlarged so that the nuts 11 cannot be entirely removed therefrom, such a construction having the advantage of preventing loss of the nuts.

While the ring 5 has been described as riveted to flanges projecting laterally from the caps 3, it would be entirely within the spirit of the invention to connect the ring to the caps in any manner or to form them integral therewith. If found desirable, the ring might be made in sections, the essential feature of the invention merely residing in the fact that the ring is offset from the central plane of the spokes so that the rim may bear directly against the extremities of the spokes and at the same time be secured to the ring. It might also be mentioned that the rim itself may be of any suitable construction and may receive either a pneumatic or other form of tire, as found desirable.

With this construction, it will be obvious that while the rim is so mounted as to be quickly and easily applied or removed from the wheel, nevertheless it is so positioned that all forces applied thereto are transmitted directly to the hub through the spokes.

Having thus described the invention, what I claim is:

1. The combination of a hub, spokes radiating from the hub, a ring carried by the spokes and offset upon one side thereof, a rim fitting over the ends of the spokes so as to bear directly against the same, and means for securing the rim to the ring, the said means consisting of a threaded stud projecting from one of the said members and capped by a nut, and a projection upon the opposite member for engagement with the threaded stud, the projection being formed with a reinforcing flange which serves as a guard for the nut to prevent the same from being turned by contact with an exterior object.

2. The combination of a hub, spokes projecting from the hub, a flat ring fitted against one side of the spokes, studs projecting from the ring, a rim fitting over the ends of the spokes, and hooked members carried by the rim and detachably engaging the studs on the ring.

3. The combination of a hub, spokes projecting from the hub, caps applied to the extremities of the spokes, a flat ring secured to the caps and fitting against one side of the spokes, studs projecting from the ring, a rim fitting over the ends of the spokes, and hooked members carried by the rim and detachably engaging the studs upon the ring.

4. The combination of a hub, spokes projecting from the hub, a ring carried by the spokes and offset therefrom, a rim fitting over the ends of the spokes, and means for securing the rim to the ring, the said means consisting of a threaded stud projecting from one of the members and engaging a projection upon the opposite member, the said threaded stud being provided with a nut having the end thereof tapered and split.

In testimony whereof I affix my signature in presence of two witnesses.

BENJAMIN R. TILLSON. [L. S.]

Witnesses:
FRANK L. RICKER,
E. T. GEORGES.